US010042244B2

(12) United States Patent
Kim et al.

(10) Patent No.: US 10,042,244 B2
(45) Date of Patent: Aug. 7, 2018

(54) PERFORMANCE SYSTEM WITH MULTI-PROJECTION ENVIRONMENT

(71) Applicant: CJ CGV CO., LTD., Seoul (KR)

(72) Inventors: Hwan Chul Kim, Seoul (KR); Su Ryeon Kang, Goyang-si (KR)

(73) Assignee: CJ CGV CO., LTD., Seoul (KR)

( * ) Notice: Subject to any disclaimer, the term of this patent is extended or adjusted under 35 U.S.C. 154(b) by 238 days.

(21) Appl. No.: 14/218,370

(22) Filed: Mar. 18, 2014

(65) Prior Publication Data
US 2014/0320828 A1 Oct. 30, 2014

(30) Foreign Application Priority Data

Apr. 30, 2013 (KR) .......................... 10-2013-0048085

(51) Int. Cl.
*H04N 9/31* (2006.01)
*G03B 21/56* (2006.01)
*G03B 31/00* (2006.01)
*H04N 21/41* (2011.01)
*H04N 5/445* (2011.01)
(Continued)

(52) U.S. Cl.
CPC ................ *G03B 31/00* (2013.01); *A47C 1/12* (2013.01); *A47C 3/18* (2013.01); *A63J 25/00* (2013.01); *E04H 3/22* (2013.01); *G02B 27/2271* (2013.01); *G03B 21/003* (2013.01); *G03B 21/14* (2013.01); *G03B 21/16* (2013.01); *G03B 21/206* (2013.01); *G03B 21/2053* (2013.01); *G03B 21/26* (2013.01); *G03B 21/56* (2013.01); *G03B 21/60* (2013.01); *G03B 21/608* (2013.01); *G03B 29/00* (2013.01); *G03B 41/00* (2013.01); *H04N 5/44591* (2013.01); *H04N 9/3147* (2013.01); *H04N 9/3182* (2013.01); *H04N 9/3185* (2013.01); *H04N 9/3194* (2013.01); *H04N 21/4122* (2013.01); *A63J 2005/002* (2013.01); *G03B 37/04* (2013.01)

(58) Field of Classification Search
CPC .... H04N 9/3147; H04N 9/3141; G03B 21/14; G03B 21/56
USPC .............................................. 353/94, 30, 31
See application file for complete search history.

(56) References Cited

U.S. PATENT DOCUMENTS 5,964,064 A * 10/1999 Goddard ................. A63J 5/021
352/43
2008/0043097 A1 2/2008 Smith
(Continued)

FOREIGN PATENT DOCUMENTS

CN 1229893 A 9/1999
CN 201689343 U 12/2010
(Continued)

OTHER PUBLICATIONS

Korean Office Action for application No. 10-2013-0048085 dated May 1, 2014.
(Continued)

*Primary Examiner* — Ryan Howard
(74) *Attorney, Agent, or Firm* — Hauptman Ham, LLP

(57) ABSTRACT

The present invention provides a performance system with a multi-projection environment including a stage installed for a performance and a plurality of projection surfaces arranged around the stage and arranged so as not to be parallel to each other, in which synchronized images are projected on the plurality of projection surfaces.

14 Claims, 10 Drawing Sheets

(51) Int. Cl.
*E04H 3/22* (2006.01)
*G02B 27/22* (2018.01)
*G03B 21/26* (2006.01)
*G03B 21/608* (2014.01)
*G03B 21/14* (2006.01)
*A47C 1/12* (2006.01)
*A47C 3/18* (2006.01)
*A63J 25/00* (2009.01)
*G03B 29/00* (2006.01)
*G03B 41/00* (2006.01)
*G03B 21/00* (2006.01)
*G03B 21/20* (2006.01)
*G03B 21/60* (2014.01)
*G03B 21/16* (2006.01)
*A63J 5/00* (2006.01)
*G03B 37/04* (2006.01)

(56) References Cited

U.S. PATENT DOCUMENTS

| | | | |
|---|---|---|---|
| 2009/0168027 A1* | 7/2009 | Dunn | G03B 21/26 353/28 |
| 2011/0214359 A1 | 9/2011 | Magpuri | |
| 2011/0215621 A1* | 9/2011 | LaForest | A47C 1/126 297/217.7 |
| 2011/0309999 A1* | 12/2011 | Chang | G03B 21/13 345/1.1 |
| 2012/0247030 A1 | 10/2012 | Magpuri | |
| 2014/0016099 A1* | 1/2014 | Choi | E04H 3/22 353/30 |

FOREIGN PATENT DOCUMENTS

| | | |
|---|---|---|
| CN | 102127979 A | 7/2011 |
| JP | 2007147786 A | 6/2007 |
| JP | 2008292643 A | 12/2008 |
| KR | 1020030084948 A | 11/2003 |
| KR | 1020090000550 A | 1/2009 |
| KR | 1020090089081 A | 8/2009 |
| KR | 101051722 B1 | 10/2011 |

OTHER PUBLICATIONS

International Search Report for application No. PCT/KR2013/011117 dated Mar. 20, 2014.
Chinese Office Action dated Jun. 1, 2017 from SIPO in connection with the counterpart Chinese Patent Application No. 201380074545.0.

* cited by examiner

[Fig. 1]
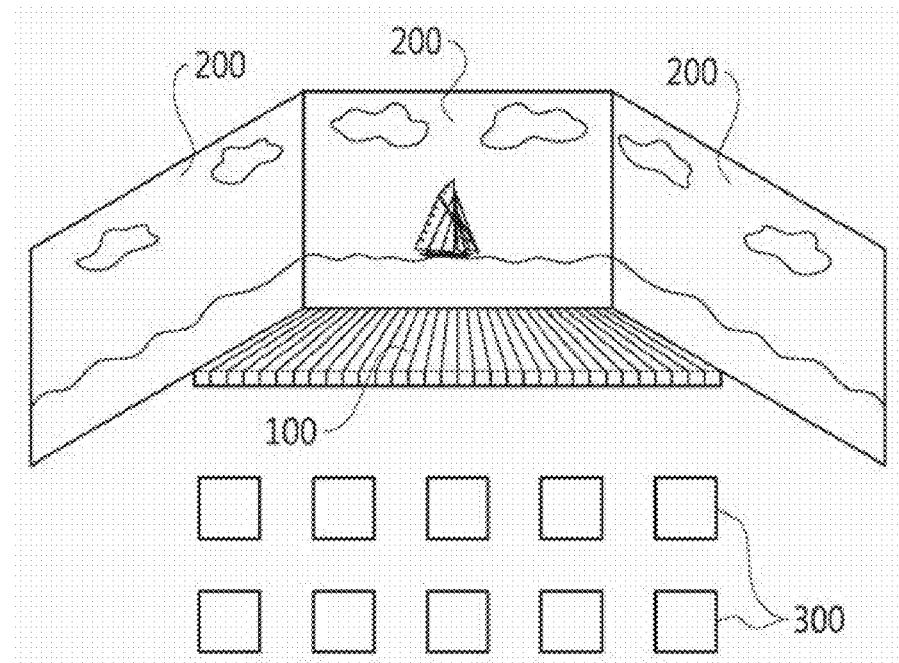
[Fig. 2]
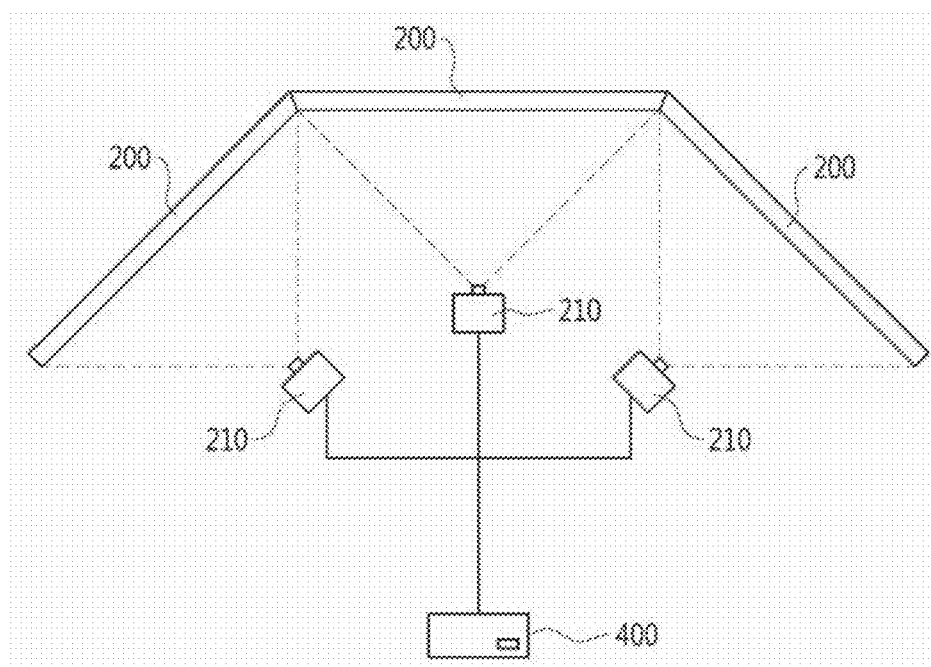

[Fig. 3]
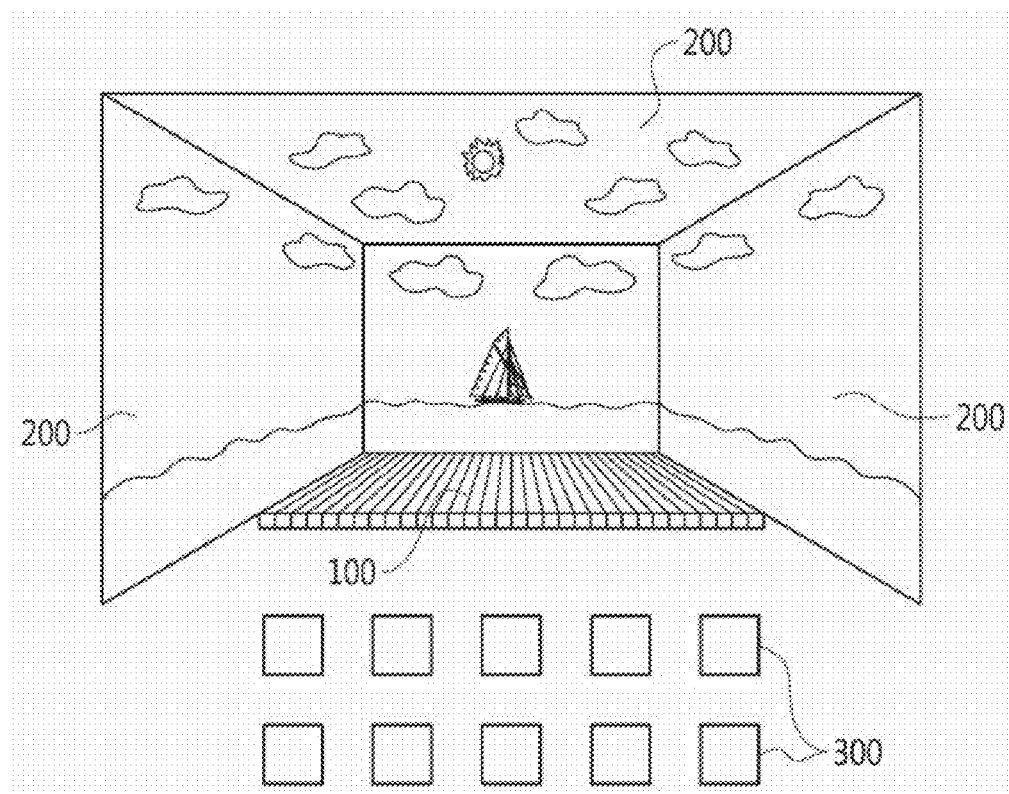

[Fig. 4]
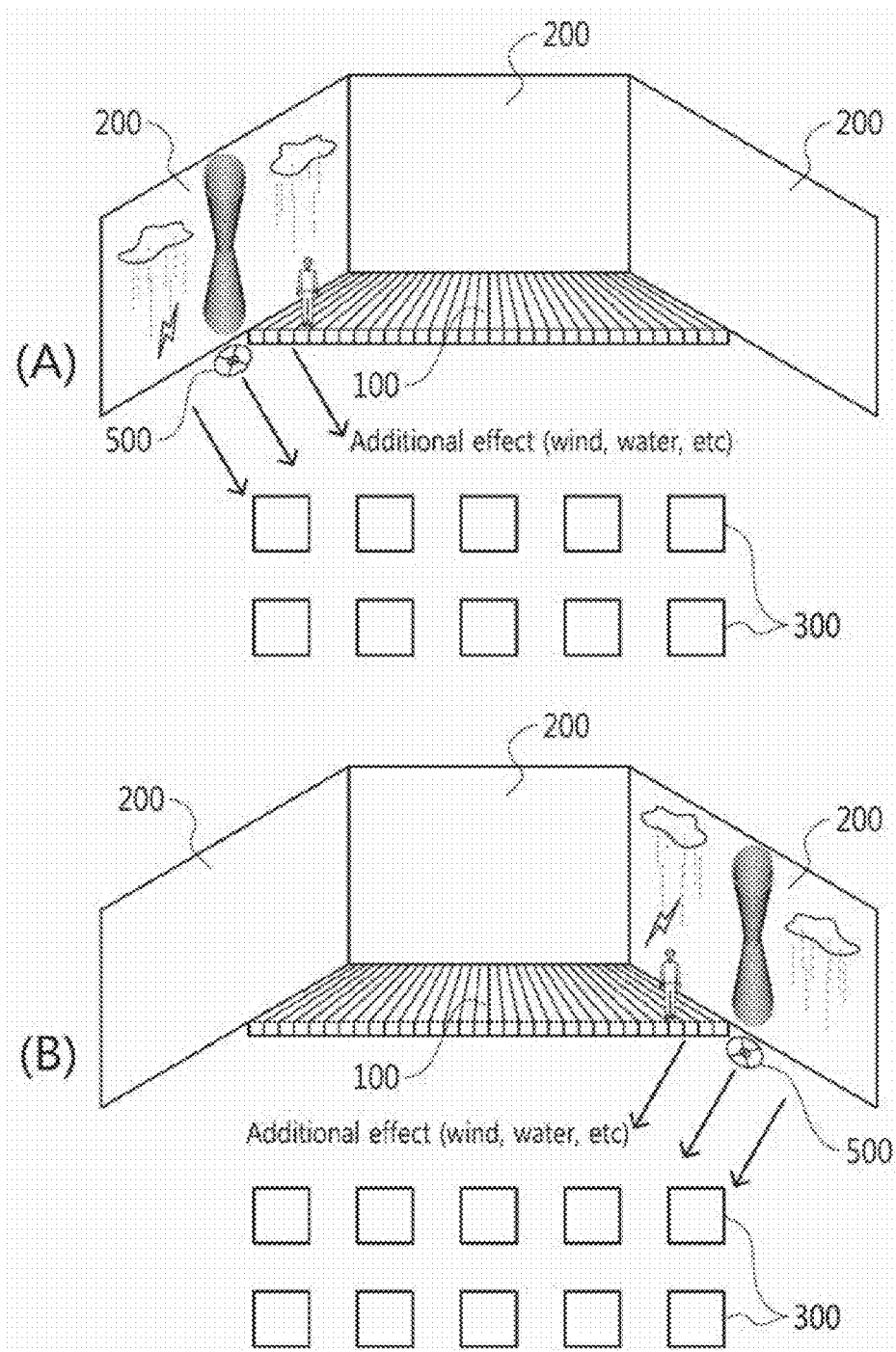

[Fig. 5]
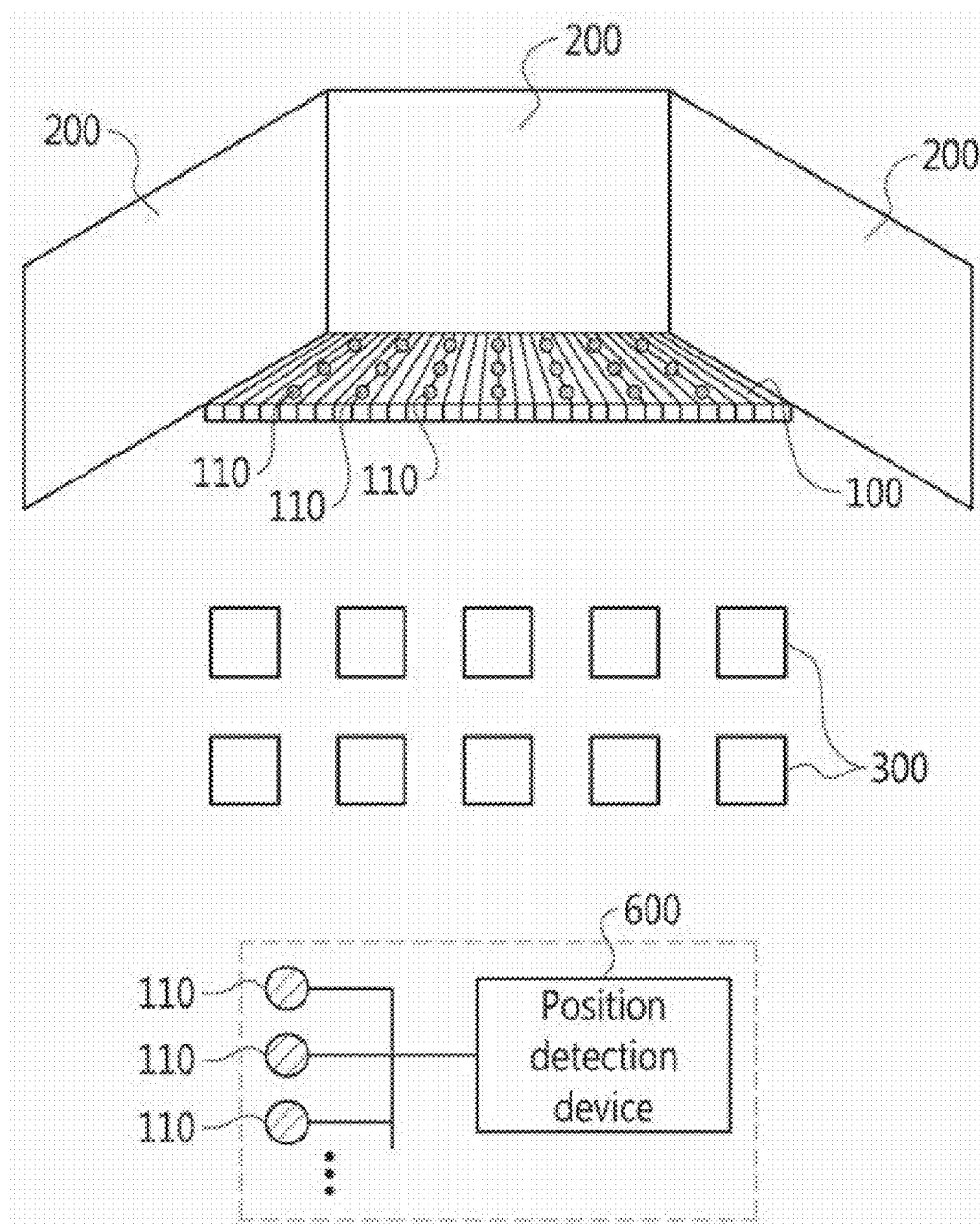

[Fig. 6]
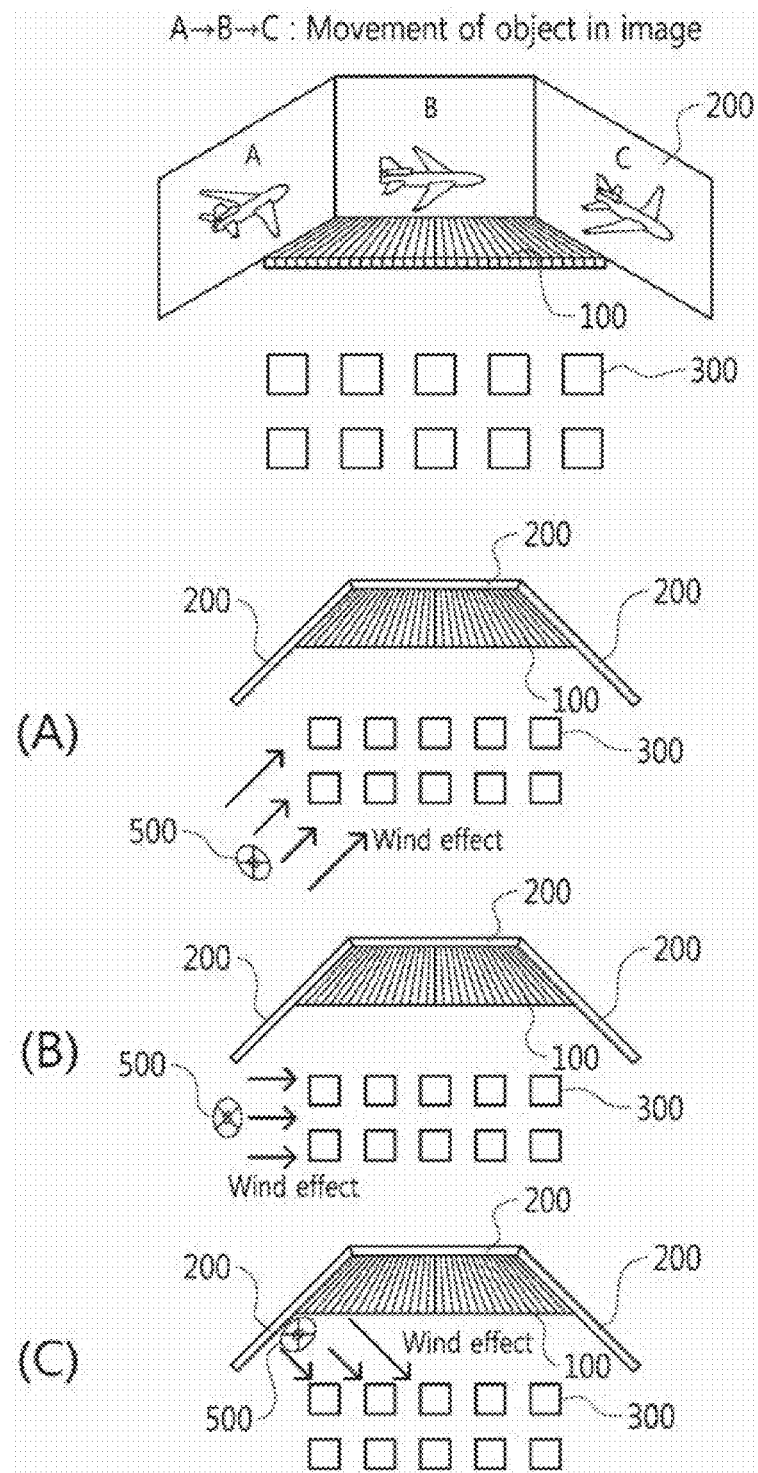

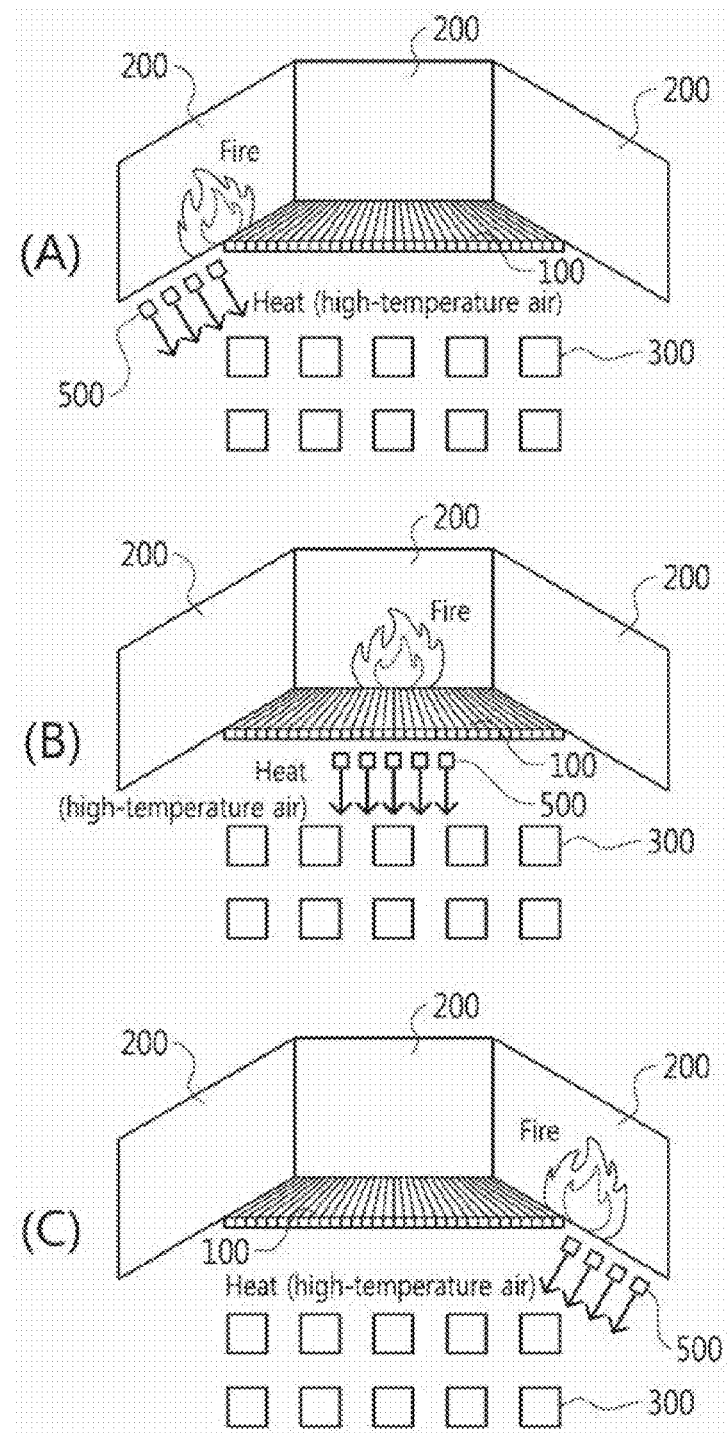

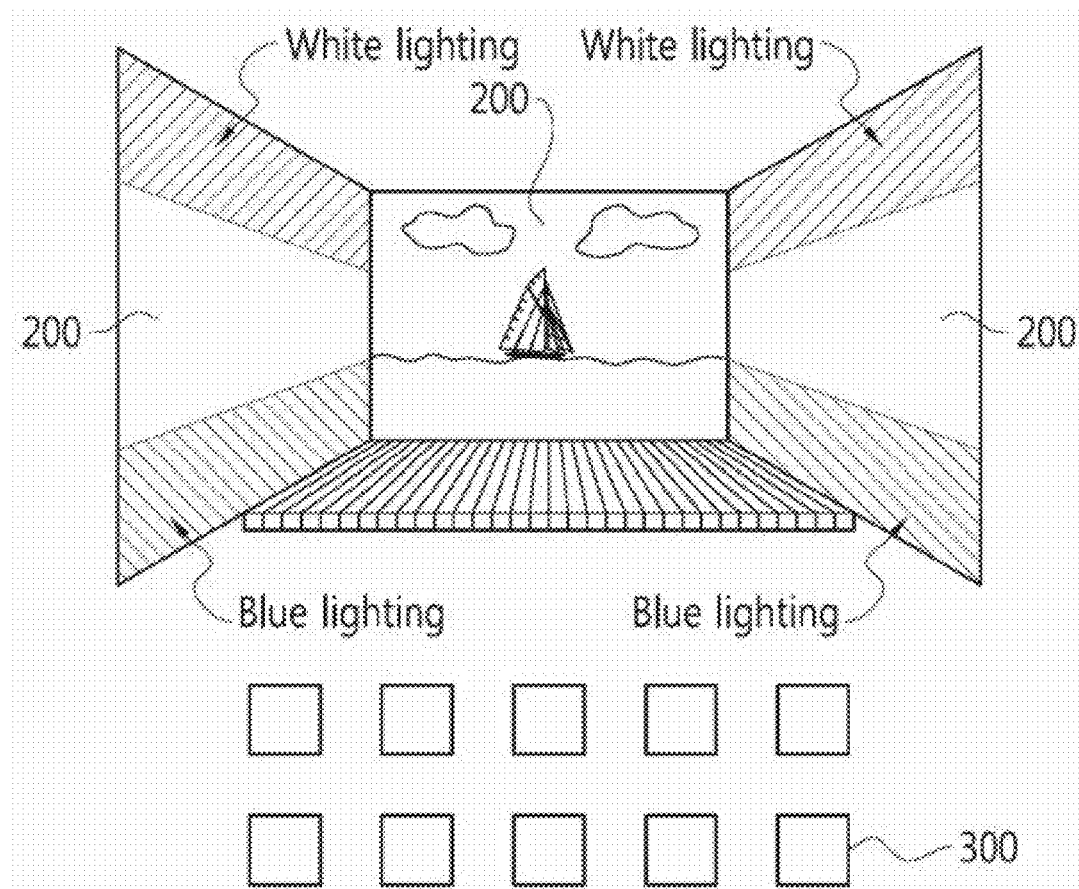
[Fig. 8]

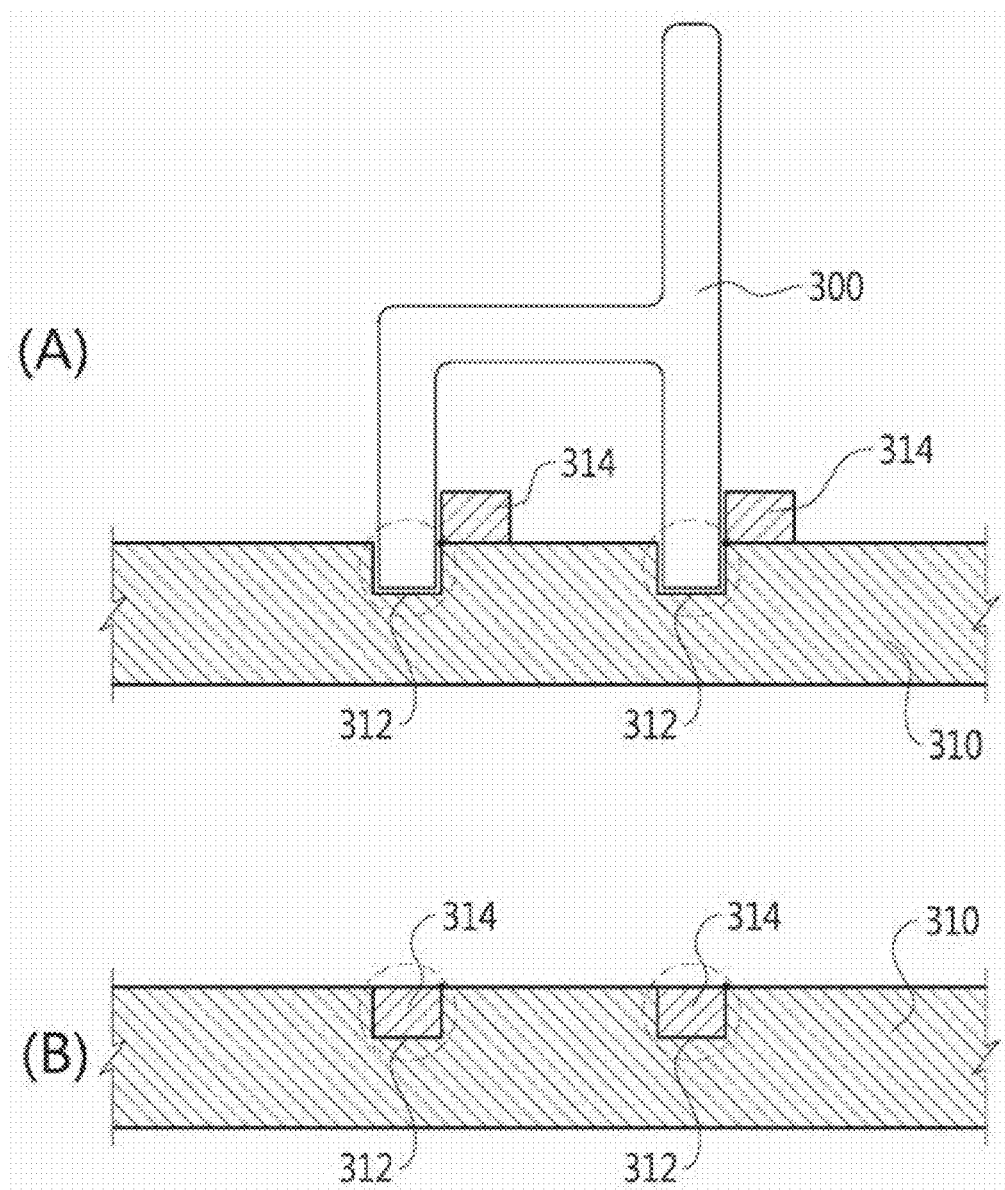
[Fig. 9]

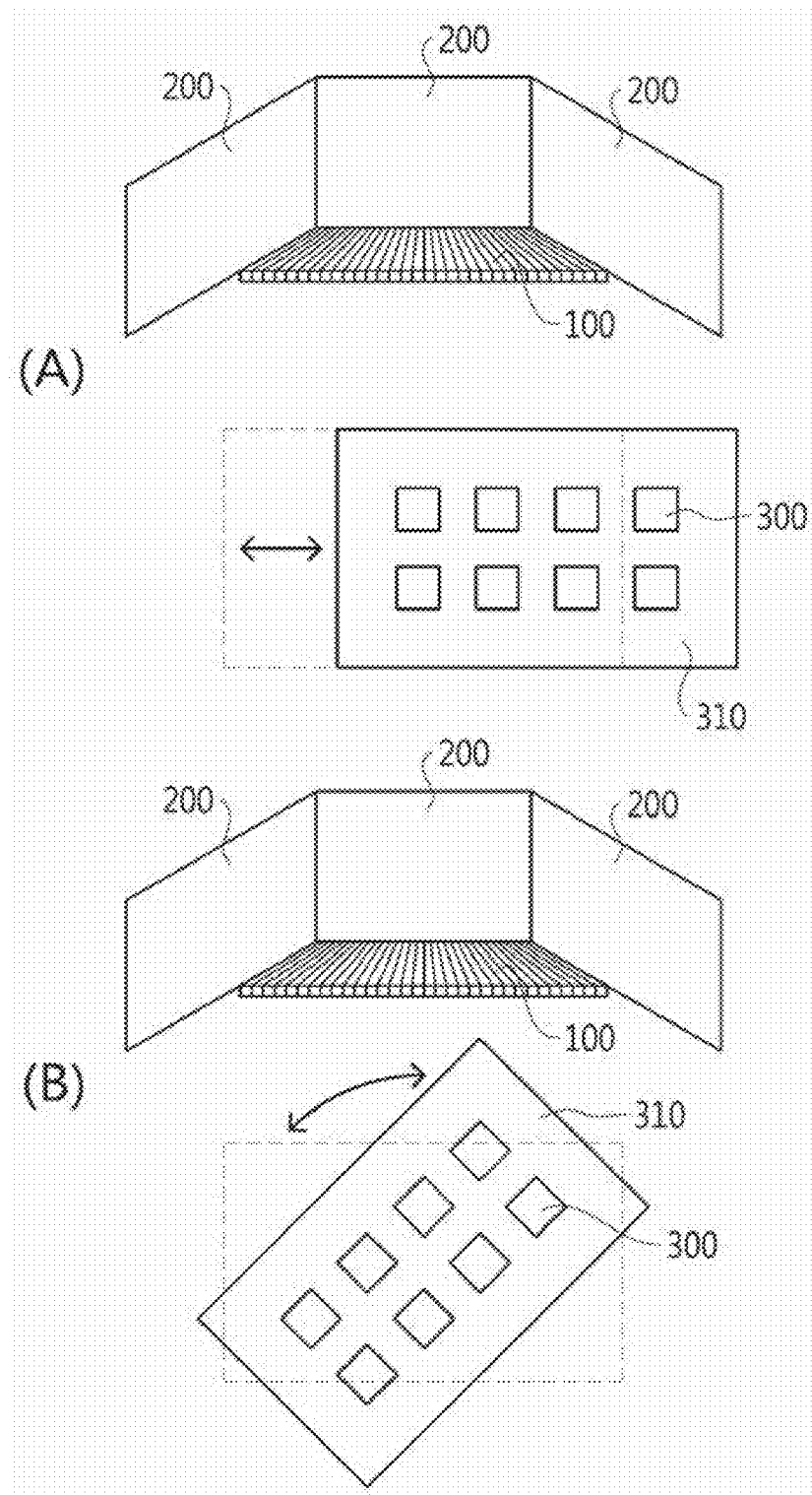
[Fig. 10]

[Fig. 11]
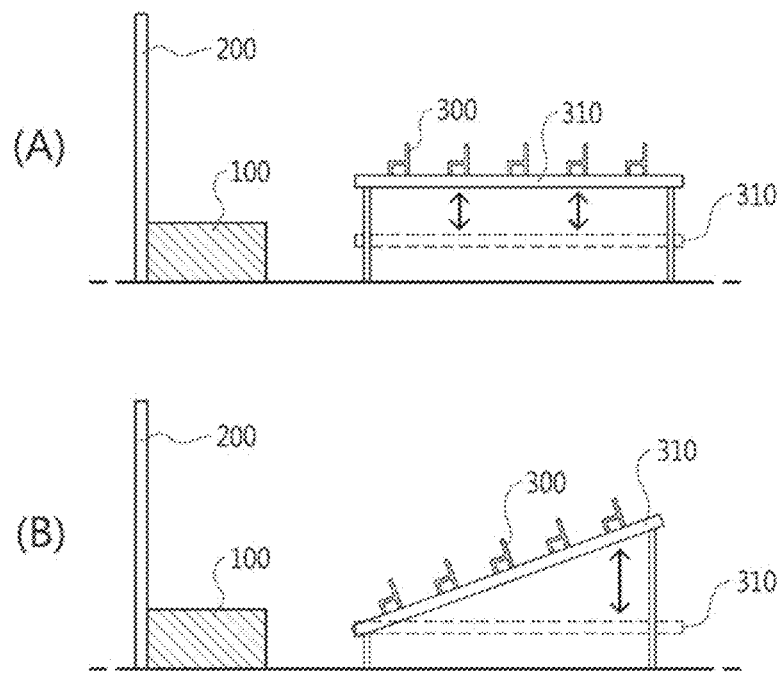
[Fig. 12]
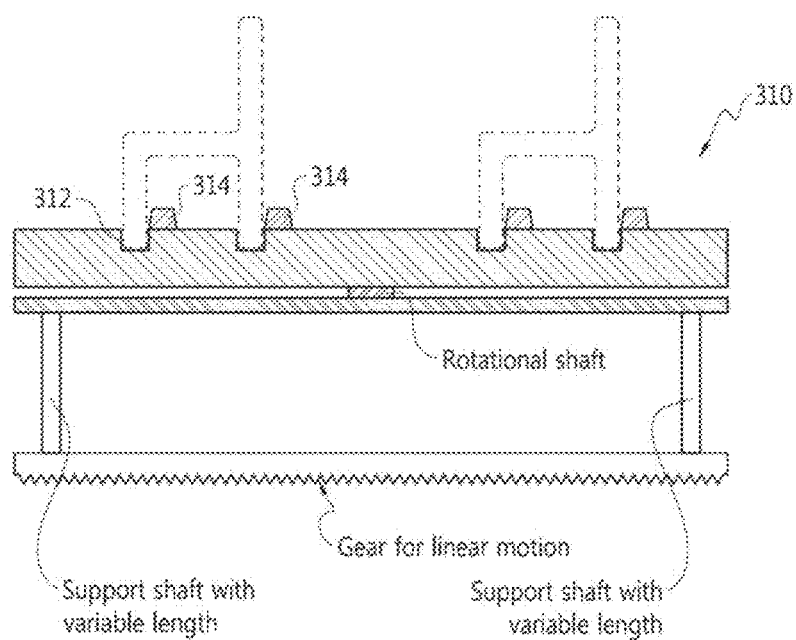

PERFORMANCE SYSTEM WITH MULTI-PROJECTION ENVIRONMENT

CROSS REFERENCE TO RELATED APPLICATION

This application claims the priority of Korean Patent Application No. 10-2013-0048085, filed on Apr. 30, 2013 in the KIPO (Korean Intellectual Property Office), which is incorporated herein by reference in its entirety.

TECHNICAL FIELD

The present invention relates to a performance system with a multi-projection environment and, more particularly, to a performance system in which a plurality of projection surfaces are arranged around a performance stage and synchronized images are provided on the plurality of projection surfaces, thus maximizing the three-dimensional effect and involvement that an audience viewing a performance can feel.

BACKGROUND ART

A performance system refers to a system that assists a performance in progress on a stage and increases the involvement of an audience in the performance. This performance system may comprise various auxiliary devices such as a display device, a speaker device, a lighting device, etc., and these auxiliary devices serve to stimulate the five senses of the audience, thus increasing the involvement of the audience in the performance in progress on the stage.

Meanwhile, in a conventional performance system, a display device is arranged only in front of an auditorium to assist the visual effect of the performance system. Specifically, the conventional performance system, in which the display device is arranged only in front of the auditorium, assists the visual effect of the performance system in such a manner to provide live images of the performance, for example.

However, according to the conventional performance system, the visual effect related to the performance is provided from the front of the system, and thus it is impossible to provide a three-dimensional visual effect to the audience. In particular, there are only walls, etc. on all sides other than the stage and the display device, and thus it is difficult for the audience to be fully involved in the performance.

Moreover, in a conventional theater system, 3D technology may be introduced to provide a visual three-dimensional effect, but in a performance system in which a performance on the stage is the main and a display device is the auxiliary, it is difficult to enhance the three-dimensional effect by introducing the 3D technology.

This is because the audience may feel dizzy between a 3D image and an actual image on the stage and special glasses (equipped with polarization filters for viewing 3D images) that the audience has to wear may reduce the involvement in the performance on the stage. Moreover, the 3D technology itself just provides images to the front of the stage, and thus it is impossible to increase the involvement of the audience in the images in other directions than the front.

Therefore, there is a need to provide a performance system of a new concept which can solve the problems associated with the prior art and maximize the three-dimensional effect that the audience feels.

DISCLOSURE OF INVENTION

Technical Problem

An object of the present invention is to provide a performance system which can provide an audience with a three-dimensional image in association with a performance on a stage.

Moreover, another object of the present invention is to provide a performance system which can provide an audience with a three-dimensional performance environment.

Solution to Problem

To achieve the above object, a performance system in accordance with an embodiment of the present invention may comprise: a stage installed for a performance; and a plurality of projection surfaces arranged around the stage and arranged so as not to be parallel to each other, wherein synchronized images are projected on the plurality of projection surfaces.

Here, the performance system may further comprise: two or more projection devices for projecting images of the plurality of projection surfaces; and a management device for controlling the operation of the two or more projection devices.

The performance system may further comprise audience seats arranged toward the stage, wherein the plurality of projection surfaces may be arranged to surround the stage and the audience seats, and synchronized images may be projected on the respective projection surfaces.

The plurality of projection surfaces may comprise a screen or a wall.

The management device may correct the image projected each projection surface based on relative differences in properties between the projection surfaces.

The performance system may further comprise an additional effect device for implementing an additional effect other than the images projected on the plurality of projection surfaces.

The additional effect may comprise sound, wind, smell, fog, temperature change, laser, water, light, or bubbles.

The performance system may further comprise a position detection device for detecting the position of an object or person placed on the stage, wherein the additional effect device may configure the direction of the additional effect differently depending on position information of the object or person generated by the position detection device.

The performance system may further comprise an imaging device for taking an image of a person placed on the stage, wherein an action taken by the person may be recognized based on the image taken by the imaging device and a predetermined additional effect may be implemented based on the recognized action.

In the performance system, a specific image may be reproduced on a projection surface arranged around the position detected by the position detection device.

The position detection device may detect the position of the object or person by means of a plurality of sensors distributed around the stage.

The additional effect device may configure the direction of the additional effect differently depending on the images projected on the plurality of projection surfaces.

When an object in the image moves between the projection surfaces, the additional effect device may change the direction of the additional effect.

When a specific event in the image occurs only on a specific projection surface among the plurality of projection surfaces, the additional effect device may implement the additional effect only in a direction that starts from the specific projection surface.

The additional effect device may be a light-emitting device, and the light-emitting device may extend a visual effect of the image by emitting light having a color similar to that of an image of a specific projection surface.

The audience seat may be detachably attached to a floor surface.

An insertion groove for detachable attachment of the audience seat may be provided on the floor surface.

An insertion groove cover, configured to prevent the insertion groove from being exposed to the outside when the audience seat is detached, may be provided on the floor surface, and the floor surface may be changed to a standing auditorium by the connection of the insertion groove and the insertion groove cover.

The floor surface may perform a linear motion, rotational motion, height adjustment motion, tilting motion, or vibration motion.

Advantageous Effects of Invention

The present invention provides a performance system in which a plurality of projection surfaces are arranged around an auditorium and synchronized images are provided on the plurality of projection surfaces, thus providing a three-dimensional visual effect to an audience viewing a performance on the stage. Therefore, it is possible to maximize the three-dimensional effect and involvement that the audience can feel from the performance.

Moreover, the present invention can maximize the three-dimensional effect that the audience feels by arranging the plurality of projection surfaces to surround the stage and the auditorium.

In addition, the present on can provide unified images on a plurality of projection surfaces, even when different types of projection surfaces are arranged.

Additionally, the present invention can provide the audience with a three-dimensional visual effect on a plurality of projection surfaces and, at the same time, provide an additional effect associated with the visual effect. Specifically, the present invention can provide an additional effect such as wind, water, fog, temperature change, etc., and the additional effect is not implemented at a random time like the prior art, but implemented in association with the three-dimensional image, which maximizes the three-dimensional effect and involvement that the audience feels.

Moreover, the present invention can change the direction of an additional effect or three-dimensional image in association with the position of a person or object placed on the stage. Specifically, the present invention can change the direction of the additional effect or three-dimensional image depending on position information generated by a position detection device located on the stage, thus maximizing the three-dimensional effect and involvement that the audience feels.

Furthermore, the present invention can flexibly configure the auditorium by detachably attaching the audience seat to a floor surface. Specifically, the audience seat may be detachably attached to the floor surface by means of an insertion groove provided on the floor surface. Therefore, it is possible to freely change the number of audience seats provided on a performance venue and easily change the entire auditorium to a standing auditorium, if necessary.

In addition, the present invention allows the floor surface to perform a linear motion, rotation motion, or tilting motion. Therefore, it is possible to provide the audience with a new type of three-dimensional effect through these motions of the floor surface. Also, the present invention can freely change the viewing direction of the audience through these motions of the floor surface and provide the audience with a viewing direction suitable for a real time situation.

BRIEF DESCRIPTION OF DRAWINGS

FIG. 1 is a diagram showing the configuration of a performance system in accordance with an embodiment of the present invention, FIG. 2 is a diagram showing the configuration for implementing a multi-projection environment that may be included in the present invention.

FIG. 3 is a diagram showing the configuration of a performance system in accordance with another embodiment of the present invention.

FIG. 4 is a conceptual diagram showing that an additional effect device that may be included in the present invention changes the direction an additional effect depending on the position of a person or object placed on a stage.

FIG. 5 is a conceptual diagram showing that sensors are installed on a stage that may be included in the present invention.

FIGS. 6 and 7 are conceptual diagrams showing that an additional effect device that may be included in the present invention changes the direction an additional effect depending on images projected on a plurality of projection surfaces.

FIG. 8 is a conceptual diagram showing that an additional effect device that may be included in the present invention extends a visual effect (color) of an image projected on a specific projection surface.

FIG. 9 is a diagram showing an example in which an audience seat that may be included in the present invention is detachably mounted.

FIGS. 10 and 11 are diagrams showing examples in which a floor surface of an auditorium that may be included in the present invention moves.

FIG. 12 is a diagram showing an example of the structure of a floor surface of an auditorium.

MODE FOR THE INVENTION

Hereinafter, a performance system according to the present invention will be described in detail with reference to the accompanying drawings. The following embodiments are provided only for illustrative purposes so that those skilled in the art can fully understand the spirit of the present invention, but the present invention is not limited thereby. Moreover, it is to be understood that all matters herein set forth in the accompanying drawings are to be interpreted as illustrative and may be in different forms from those actually implemented.

Next, a performance system in accordance with an embodiment of the present invention will be described with reference to FIGS. 1 to 3.

Referring to FIG. 1, the performance system in accordance with an embodiment of the present invention may comprise a stage 100 installed for a performance, audience seats 300 arranged toward the stage 100, and a plurality of projection surfaces 200 arranged around the stage 100 so as not to be parallel to each other.

The performance system in accordance with an embodiment of the present invention is different from conventional performance systems in that it is provided with a "multi-projection environment". Here, the "multi-projection environment" refers to an environment that provides a plurality of synchronized images on the plurality of projection surfaces 200, which are preferably arranged to surround the stage 100 and the audience seats 300, to maximize the three-dimensional effect and involvement that the audience feels.

The stage 100 is provided for a performance and may be configured in various forms depending on the type of the performance (e.g., a concert, musical, play, dance, opera, magic show, etc.)

The audience seats 300 are provided for convenience of the audiences viewing the performance. The audience seats 300 may preferably be arranged toward the stage 100 and may preferably be surrounded by the plurality of projection surfaces 200 together with the stage 100.

Meanwhile, when the performance system is used as a standing performance venue, the performance venue may not be equipped with the audience seats 300.

The plurality of projection surfaces 200 are configured to implement the multi-projection environment. Synchronized images may be projected on the plurality of projection surfaces 200, and thus a unified visual effect can be provided to the audience through the synchronized images.

Meanwhile, the plurality of projection surfaces 200 may be arranged so as not to be parallel to each other. According to the present invention, the plurality of projection surfaces 200 are three-dimensionally arranged so as not to be parallel to each other, and thus it is possible to provide the audience with a three-dimensional image with high three-dimensional effect and immersion without applying the 3D technology to the image itself.

Moreover, it is preferable that the plurality of projection surfaces 200 are arranged to surround the stage 100 and the audience seats 300. Therefore, the audience can feel as if they are in a space created by the synchronized images reproduced on the plurality of projection surfaces 200, and thus the three-dimensional effect and involvement that the audience feels can be maximized.

Furthermore, the angle between the projection surfaces 200 is not limited to a specific angle, and the plurality of projection surfaces 200 may be arranged at various angles as long as the audience can feel the three-dimensional effect.

In addition, the plurality of projection surfaces 200 may be arranged to be adjacent to each other or to be spaced from each other and, even in this case, it is preferable that the plurality of projection surfaces 200 are arranged to surround the audience seats 300.

FIG. 1 shows an example in which the plurality of projection surfaces 200 are arranged on the front, left, and right sides with respect to the audience seats 300, and FIG. 3 shows an example in which the plurality of projection surfaces 200 are arranged on the front, left, right, and top sides with respect to the audience seats 300.

Meanwhile, the plurality of projection surfaces 200 may comprise different types of projection surfaces. For example, the plurality of projection surfaces 200 may be configured in such a manner that a screen and a wall are mixed, that different types of screens are mixed, or that different types of walls are mixed. Therefore, the present invention can be applied to a conventional performance venue comprising a single screen and a plurality of walls only and can implement the multi-projection environment without a plurality of screens. However, in these environments, the unity of the images reproduced on the plurality of projection surfaces 200 may be reduced due to heterogeneity (brightness, color, reflectivity, etc.) between the screen and the walls, but this problem can be overcome by image correction of a management device 400 which will be described later.

Meanwhile, the screen is configured to reflect the projected image such that the audience can enjoy the image and may have various types that can perform this function (even when the name of a particular component is not the screen, if it can perform the function of reflecting the projected image to the audience, it may fall within the range of the screen).

For example, the screen may be formed of various materials such as a matte screen, a lenticular screen, a glass beaded screen, a silver screen, a high-gain screen, etc.

Moreover, the screen may be of various types such as an embedded electric screen, an exposed electric screen, a wall-mounted screen, a tripod screen, a road warrior screen, a high-brightness screen, a sound screen, etc.

Furthermore, the screen may include a water screen, a fog screen, a holographic screen, a miracle screen (using magic glass), etc. as well as other various types of screens.

In addition, the screen may also be formed of PVC, white-coated PVC, pearl gloss-coated PVC, or aluminum-coated PVC. The type of the screen may be selected depending on the size of each theater, the arrangement of the screen, the properties of the image reproduced on the screen, the resolution of the image, etc. For example, the screen formed of PVC is more suitable for a relatively small theater in terms of the reflectance based on the angle at which the image is projected, whereas, the screen formed of pearl gloss-coated PVC is suitable for a relatively large theater. Meanwhile, the screen formed of aluminum PVC has an excellent performance of reproducing a digital image or 3D image, compared to other screens.

Additionally, the wall does not represent only the wall as a word meaning, but refers to various structural surfaces present in the theater. For example the wall may include various structural surfaces in the theater such as a ceiling, floor, left wall, right wall, front wall, rear wall, etc. as well as structural surfaces on which fixtures such as curtain, etc. are provided.

Referring to FIG. 2, the performance system in accordance with embodiment of the present invention may further comprise two or more projection devices 210 for projecting images on the plurality of projection surfaces 200 and a management device 400 for controlling the operation of the two or more projection devices 210, and thus images can be projected on the plurality of projection surfaces 200 by the two or more projection devices 210 and the management device 400.

The two or more projection devices 210 refer to devices that project images on the plurality of projection surfaces 200. These projection devices 210 may have a heating unit such as an optical system, may project enlarged images on the projection surfaces, and may also be implemented in various ways. For example, the projection devices 210 may be implemented by using a cathode ray tube (CRT), using a liquid crystal display (LCD), by digital light processing (DLP) using a digital micromirror device (DMD), etc.

Moreover, the two or more projection devices 210 may project images, which are synchronized with each other, on the plurality of projection surfaces 200. In this case, it is preferable that the synchronized images provide the audience with a sense of unity. Accordingly, the audience can recognize the synchronized images in various directions of the respective projection surfaces through the images projected by the two or more projection devices 210, and the three-dimensional effect and involvement that the audience feels can be increased by such recognition.

Meanwhile, the two or more projection devices 210 may selectively operate to project synchronized images on all of the projection surfaces 200 or on a portion of the projection surfaces 200 by the selective operation. Moreover, these projection operations may be performed alternately to create a dynamic visual effect.

The management device 400 is configured to control the two or more projection devices 210. The management device 400 may be connected in parallel to the two or more projection devices 210 to control the respective projection devices 210 either simultaneously or individually.

Moreover, the management device 400 may manage the images projected by the two or more projection devices 210. Specifically, the management device 400 may generally control the images projected by the two or more projection devices 210. The management device 400 may determine an image that will be projected by each projection device 210 and transmit the determined images to the respective projection devices 210. Here, the management device 400 may manage the images projected by the two or more projection devices 210 in various ways such as (1) storing the images that will be projected by the respective projection devices 210 previously in a database and transmitting the stored images to the respective projection devices 210, (2) generating the images that will be projected by the respective projection devices 210 in real time and transmitting the generated images to the respective projection devices 210, (3) receiving the images that will be projected by the respective projection devices 210 from the outside (through a communication network) in real time and transmitting the received images to the respective projection devices 210, etc.

Furthermore, the management device 400 may correct the images projected by the respective projection devices 210 based on relative differences in properties between the projection surfaces 200. Specifically, the management device 400 may analyze a relative difference in reflectance, a relative difference in brightness, a relative difference in chromaticity, etc. between the projection surfaces 200 and correct the images projected by the respective projection devices 210 to offset the differences in properties. For example, when the brightness of a specific projection surface is higher than that of other projection surfaces, the management device 400 may reduce the brightness of the image projected on the specific projection surface, thus offsetting the relative difference in brightness. Moreover, when the chromaticity of a specific projection surface is lower than that of other projection surfaces, the management device 400 may increase the chromaticity of the image projected on the specific projection surface, thus offsetting the relative difference in chromaticity. Furthermore, when the reflectance of a specific projection surface is higher than that of other projection surfaces, the management device 400 may reduce the brightness of the image projected on the specific projection surface, thus offsetting the relative difference in reflectance. Therefore, the management device 400 can provide the audience with unified images by correcting the images based on the differences in properties between the projection surfaces, even when the plurality of projection surfaces 200 are composed of different types of projection surfaces (e.g., a screen, walls, etc.).

Moreover, the management device 400 may control the two or more projection devices 210 to project synchronized images. Specifically, the management device 400 may synchronize the projection operations of the two or more projection devices 210 by transmitting a synchronization signal including time information to each projection device 210. In this case, the management device 400 may control the projection operation in units of frames using the synchronization signal including the time information.

Meanwhile, the management device 400 may perform the function of generally managing the performance system. Specifically, the management device 400 may manage a variety of information for implementing the performance system and control the operation of various devices that may be contained in the system. The management device 400 may be implemented with various electronic devices. The management device 400 may be implemented with a single electronic device or with several electronic devices interconnected to each other. For example, the management device 400 may be implemented in a single server or in such a manner that two or more servers are interconnected. Moreover, the management device 400 may be implemented in such a manner that a server and other electronic devices are interconnected or implemented in arithmetic units other than the server.

Moreover, the management device 400 may transmit and receive information to and from various devices through various communication networks (wired or wireless) and various protocols and manage the performance system using the transmitted and received information.

Next, a performance system in accordance with another embodiment of the present invention will be described.

The performance system in accordance with another embodiment of the present invention may further comprise an additional effect device 500 for implementing an additional effect other than the images projected on the plurality of projection surfaces 200.

The additional effect device 500 is a device for implementing an additional effect other than the images projected on the plurality of projection surfaces 200. Specifically, the additional effect device 500 is a device that adds a visual effect or an effect that can be perceived by other senses than sight so as to increase the immersion and reality that the audience can feel while watching a performance. The additional effects that can be provided by the additional effect device 500 may include a sound effect, a wind effect, a smell effect, a fog effect, a temperature change effect, a laser effect, a light effect, a bubble effect, a water jet effect, etc. as well as various effects associated with the five senses of human. Therefore, the additional effect device 500 may comprise various devices such as a speaker, an air blower, a fragrance diffuser, a fog machine, a light-emitting device, a heater, a cooler, a laser device, a bubble generator, an LED, a water jet, etc. which can stimulate the five senses of human.

Moreover, it is preferable that a plurality of additional effect devices 500 are installed in various locations of the performance venue, and in particular, it is preferable that the additional effect devices 500 are distributed in various directions with respect to the audience seats 300. Therefore, the direction of the additional effect can be changed by selectively operating the additional effect devices 500 distributed in various directions (in this case, it is preferable that the direction of the additional effect created by the additional effect device 500 varies depending on an event on the stage or an event in the image projected on the projection surface).

Meanwhile, the plurality of additional effect devices 500 may be controlled by the management device 40. Specifically, the plurality of additional effect devices 500 may be connected (wired or wirelessly) in parallel to the management device 400 to be controlled either simultaneously or individually.

Next, the features of the present invention, which are related to the additional effect device 500, will be described with reference to FIGS. 4 and 5.

Referring to FIG. 4, the additional effect device 500 may configure the direction of the additional effect differently depending on the position of an object or person placed on the stage 100. That is, when the position of an object or person placed on the stage 100 is changed, the additional effect device 500 may change the direction of the additional effect to a direction that matches the changed position.

For example, (1) when a person is located on the left side of the stage 100, the additional effect device 500 may implement the additional effect in a direction starting from the left side of the stage 100 (FIG. 4A); otherwise, (2) when a person is located on the right side of the stage 100, the additional effect device 500 may implement the additional effect in a direction starting from the right side of the stage 100 (FIG. 4B). In addition to these examples, the direction of the additional effect can be changed in various manners depending on the position of a person or object placed on the stage 100.

Meanwhile, in order to change the direction of the additional effect depending on the position of the person or object placed on the stage 100, it is necessary to detect the position of the person or object placed on the stage 100. Accordingly, the performance system may further comprise a position detection device 600 that can detect the position of the person or object to implement this embodiment.

Here, the position detection device 600 detects the position of the object or person placed on the stage 100 and generates position information of the object or person placed on the stage 100 based on the detected information. The position detection device 600 may detect the position of the object or person placed on the stage 100 by various methods such as ultrasonic waves, infrared rays, etc.

An example of the position detection device 600 will now be described with reference to FIG. 5. The position detection device 600 may detect the position of the object or person by means of a plurality of sensors 110. Here, the plurality of sensors 110 may be ultrasonic sensors or infrared sensors and may preferably be distributed in various locations on the stage 100 as shown in FIG. 5. Accordingly, the position detection device 600 can identify the position of the object or person placed on the stage 100 by analyzing information selectively detected by the plurality of sensors 110.

Meanwhile, the operations of the additional effect system 500 and the position detection device 600 may be controlled by the management device 400. Moreover, the position information generated by the position detection device 600 may be transmitted to the management device 400 and integratedly managed and used by the management device 400

The management device 400 may provide directionality to the images reproduced on the plurality of projection surfaces 200 with reference to the position information of the object or person generated by the position detection device 600.

For example, the management device 400 may control a specific image to be reproduced only on a projection surface arranged around the position of the object or person on the stage, thus providing directionality to the images reproduced on the plurality of projection surfaces 200. Referring to FIG. 4, (1) when a person is located on the left side of the stage 100 (FIG. 4A), the management device 400 may control a specific image to be reproduced only on a projection surface arranged on the left side of the stage 100; otherwise, (2) when a person is located on the right side of the stage 100 (FIG. 4B), the management device 400 may control a specific image to be reproduced only on a projection surface arranged on the right side of the stage 100 (the image is provided only in the right direction).

Therefore, in this embodiment, the direction of the additional effect and the projection direction of the image can be changed at the same time depending on the position of the object or person placed on the stage 100, and thus the three-dimensional effect that the audience feels can be further improved.

Meanwhile, the present invention may configure the projection direction of the image or the direction of the additional effect differently depending on an event that is created by a person placed on the stage. That is, when a person placed on the stage 100 takes a specific action, the management device 400 may change the direction of the additional effect to a direction that corresponds to the specific action or reproduce an image in a direction that corresponds to the specific action by recognizing the specific action of the person.

For example, (1) when a magician on the stage 100 moves his or her hand to the left while a magic show is in progress on the stage 100, the present invention can reproduce a predetermined image (i.e., an image prepared by the magician) on the left projection surface and provide directionality to the additional effect by operating the additional effect devices installed on the left side. (2) Moreover, when a singer on the stage 100 draws a great circle while a concert is in progress on the stage 100, the present invention can reproduce a predetermined image (i.e. an image prepared by the singer) on all of the projection surfaces and implement the additional effect in all directions by operating all of the additional effect devices provided in the performance venue. (3) Furthermore, when a performer on the stage 100 bows to the right while a performance is in progress on the stage 100, the present invention can reproduce a predetermined image (e.g., an ending image prepared by the performer to express his or her gratitude, an image of the audience on the right side taken by a camera during the performance, etc.) on the right projection surface of the performance venue and provide directionality to the additional effect by operating the additional effect devices installed on the right side.

In this case, the present invention can recognize a specific action that the person takes in various manners. For example, (1) the present invention may provide an imaging device for taking a figure of the person placed on the stage and recognize a specific action that the person on the stage takes by analyzing the taken image. In more detail, the performance system may further comprise an imaging device for taking a person placed on the stage, and the operation of the imaging device or the images taken by the imaging device may be analyzed and controlled by the management device 400. In this case, the management device 400 may extract an image (e.g., an image of the figure) of the person placed on the stage from the taken image and analyze the pattern of movement of the extracted image of the person. Accordingly, the management device 400 can recognize whether the person on the stage takes a specific action by determining whether the analyzed pattern of movement matches the pattern of movement of a predetermined specific action. (2) Moreover, the present invention may provide action recognition sensors that three-dimensionally recognize an action that the person on the stage 100 takes and recognize the specific action using the action recognition sensors. In this case, the action recognition sensors may be distributed around the stage 100, and the management device 400 can recognize whether the person on the stage takes a specific action by analyzing information transmitted from the action recognition sensors. (3) Furthermore, the present invention can recognize a specific action that the person on the stage 100 takes by various methods other than those described above.

Next, the features of the present invention, which are related to the additional effect device 500, will be described with reference to FIGS. 6 and 7.

The additional effect device 500 may configure the direction of the additional effect differently depending on the images projected on the plurality of projection surfaces 200.

When an object in the image moves between the projection surfaces for example, the additional effect device 500 can change the direction of the additional effect. Referring to FIG. 6, when an object (aircraft) in the images moves from the left projection surface (A) to the middle projection surface (B) and to the right projection surface (C), the additional effect device 500 can change the direction of the additional effect (e.g., wind). Specifically, the additional effect device 500 can change the direction (indicated by the arrows in the figure) of the additional effect (e.g., wind) depending on the movement direction of the object as the object in the images moves between the projection surfaces (A→B and B→C, visual handover between the projection surfaces), and thus the reality and immersion that the audience feels can be maximized by the change in the direction of the additional effect (meanwhile, the change in the direction of the additional effect may be achieved by selectively operating the plurality of distributed additional effect devices 500 or configuring the additional effect devices 500 to be moved).

Furthermore, when a specific event in the image occurs only on a specific projection surface among the plurality of projection surfaces 200, the additional effect device 500 may implement the additional effect only in a direction that starts from a specific projection surface. Referring to FIG. 7, when a specific event (e.g., afire) occurs only in the image on the left projection surface (A), only in the image on the middle projection surface (B), or only in the image on the right projection surface (C), the additional effect device 500 may implement the additional effect (e.g., heat, high-temperature air, etc.) only in the direction that starts from each projection surface. Therefore, when a specific event occurs only on a specific projection surface, the audience can recognize the additional effect associated with the specific event together with the directionality and thus can feel maximized reality and immersion (meanwhile, the change in the direction of the additional effect may be achieved by selectively operating the plurality of distributed additional effect devices 500 or configuring the additional effect devices 500 to be moved).

Next, the features of the present invention, which are related to the additional effect device 500, will be described with reference to FIG. 8.

The additional effect device 500 may be configured as a visual device to extend a visual element (e.g., color, dazzle, etc.) included in an image on a specific projection surface to the periphery.

A specific embodiment of the additional effect device 500 will now be described with reference to FIG. 8. The additional effect device 500 may be configured as a light-emitting device installed around the projection surfaces. The light-emitting device can extend a visual effect by emitting light of the same color as that of an image of a specific projection surface (e.g., that of an object in the image, that of a background in the image, etc.) to the periphery. Therefore, the light-emitting device can further improve the three-dimensional effect that the audience fells by the extension of the visual element.

Meanwhile, the light-emitting device may comprise all light-emitting elements that emit light of red (R), green (G), and blue (B) and may selectively emit light of various colors using these R, G, and B light-emitting elements. Here, the light-emitting elements may be formed of various types of light-emitting elements such as heating lamps, fluorescent lamps, metal halide lamps, xenon lamps, mercury lamps, UV lamps, LEDs, semiconductor lasers, halogen lamps, etc.

Moreover, the light-emitting device may be controlled by the management device 400. In this case, the management device 400 may analyze the color included in an image of a specific projection surface (e.g., the color of an object in an image, the color of a background, the average color of the entire image, etc.) and control the color of light emitted by the light-emitting device.

Next, a performance system in accordance with another embodiment of the present invention will be described.

In a performance system in accordance with another embodiment of the present invention, the audience seats 300 may be detachably attached to a floor surface 310. Moreover, the floor surface 310 to which the audience seat 300 is detachably mounted may be configured to be moved.

Next, an example in which the audience seat 300 is detachably mounted will be described with reference to FIG. 9.

Referring to FIG. 9, the audience seat 300 may be detachably attached to the floor surface 310 of an auditorium. Specifically, the audience seat 300 may be detachably inserted into an insertion groove 312 provided on the floor surface 310 of the auditorium. Therefore, the arrangement of the audience seats 300 can be dynamically reconfigured depending on the scale of a performance, the number of audiences, etc. through the above configuration.

Meanwhile, an insertion groove cover 314, which may be connected to the insertion groove 312 in a stage where the audience seat 300 is detached, may be further provided on the floor surface 310. This insertion groove cover 314 can prevent the insertion groove 312 from being exposed to the outside in a state where the audience seat 300 is detached. Therefore, the floor surface 310 of the auditorium may be changed to a flat surface by the connection of the insertion groove 312 and the insertion groove cover 314, and thus the flat floor surface 310 can be used as a standing auditorium.

As a result, the present invention can configure the audience seat 300 to be detachably attached to the floor surface 310 using the insertion groove 312 and the insertion groove cover 314 provided on the floor surface 310 of the auditorium and thus can provide various types of auditoriums such as (1) an auditorium in which the arrangement of the audience seats 300 can be dynamically changed, (2) a standing auditorium, etc.

Next, examples in which the floor surface 310 to which the audience seat 300 is detachably mounted is configured to be moved will be described with reference to FIGS. 10 to 12.

The floor surface 310 to which the audience seat 300 is detachably mounted may perform various types of motions (e.g., a linear motion, rotational motion, height adjustment motion, tilting motion, etc.) depending on the progression of the performance, thus providing the audience with a dynamic three-dimensional effect.

Referring to FIG. 10A, the floor surface 310 may perform a linear motion. Specifically, the floor surface 310 may move in a left and right direction or in a front and rear direction in a stage where the audience seat 300 is connected thereto and may move in various other directions. Therefore, the linear motion of the floor surface 310 can provide the audience with a dynamic three-dimensional effect.

Meanwhile, the linear motion of the floor surface 310 may be implemented with gear provided on the floor surface 310 and an actuator operating the gear or a rail and a wheel. Moreover, the linear motion of the floor surface 310 may also be implemented in various other ways. Furthermore, the components for the linear motion may be integratedly controlled by the management device 400.

Referring to FIG. 10B, the floor surface 310 may perform a rotational motion. Specifically, the floor surface 310 may move in a clockwise direction or in a counter-clockwise direction in a stage where the audience seat 300 is connected thereto. Therefore, the rotational motion of the floor surface 310 can provide the audience with a dynamic three-dimensional effect.

Meanwhile, the rotational motion of the floor surface 310 may be implemented with a rotational shaft provided in the center of the floor surface 310 and an actuator for rotating the rotational shaft and may also be implemented in various other ways. Moreover, the components for the rotational motion may be integratedly controlled by the management device 400.

Meanwhile, a separate vibration device not shown) may be provided in the floor surface 310 to provide a vibration effect.

Referring to FIG. 11, the floor surface 310 may perform a height adjustment motion or tilting motion. Specifically, the floor surface 310 may adjust the height up and down (A) or may tilt in various directions such as in a forward direction, in a right direction, in a left direction, in a backward direction, etc. (B). Therefore, the height adjustment motion or tilting motion of the floor surface 310 can provide the audience with a dynamic three-dimensional effect.

Meanwhile, the height adjustment motion or tilting motion of the floor surface 310 may be implemented with a support shaft having a variable length and an actuator for moving the support shaft. Specifically, after a plurality of support shafts having a variable length are provided on the floor surface 310. (1) the height of the floor surface 310 may be adjusted by changing the length of all support shafts identically or (2) the floor surface 310 may tilt by changing the length of the support shafts differently.

Meanwhile, the height adjustment motion or tilting motion of the floor surface 310 may also be implemented in various other ways. Moreover, the components related to the height adjustment motion or tilting motion may be integratedly controlled by the management device 400.

Referring to FIG. 12, an example of the floor surface 310 in which all of the linear motion, the rotational motion, the height adjustment motion, and the tilting motion can be implemented is shown.

Here, the floor surface 310 may comprise a gear for linear motion, a rotational shaft for rotational motion, and a plurality of support shafts for height adjustment motion or tilting motion, and may also comprise an actuator for operating these components. Moreover, a vibration device (not shown) for vibrating the floor surface 310 may be provided in the floor surface 310. The operation of these components ma be generally controlled by the management device 400.

Meanwhile, the motions of the floor surface 310 (e.g., the linear motion, rotational motion, height adjustment motion, tilting motion, etc.) may be performed together with the two or more projection devices 210, the additional effect device 500, or the position detection device 600. Specifically, the floor surface 310 may move in synchronization with a change in images projected on the plurality of projection surfaces 200 or in synchronization with an additional effect created by the additional effect device 500. Moreover, the floor surface 310 may change the type or direction of motion depending on position information generated by the position detection device 600.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The invention claimed is:

1. A performance system comprising:
a stage installed for a performance;
a plurality of projection surfaces comprising a screen and a wall, arranged around the stage, and arranged unparallel to each other;
a plurality of projection devices configured to project images on the plurality of projection surfaces;
a management device configured to control the plurality of projection devices;
a position detection device configured to detect a position of an object or person placed on the stage; and
an additional effect device configured to perform an additional effect other than the images projected on the plurality of projection surfaces,
wherein the images projected on the plurality of projection surfaces are synchronized each other,
wherein the management device is configured to correct the synchronized images projected on the plurality of the projection surfaces based on relative differences in the at least brightness, color and reflectivity between the screen and the wall, and
wherein the additional effect device is configured to configure a direction of the additional effect differently depending on position information of the detected position of the object or the detected person.

2. The performance system of claim 1, further comprising:
audience seats arranged toward the stage,
wherein the plurality of projection surfaces are arranged to surround the stage and the audience seats, and
wherein the synchronized images are projected on the plurality of projection surfaces, respectively.

3. The performance system of claim 1, wherein the additional effect comprises wind, smell, fog, temperature change, laser, water, light, or bubbles.

4. The performance system of claim 1, further comprising:
an imaging device configured to take an image of a person on the stage,
wherein the imaging device is configured to recognize movement of the person based on the image taken by the imaging device, and
wherein the additional effect device is configured to perform the additional effect based on the recognized movement.

5. The performance system of claim 1, wherein, among the plurality of the projection surfaces, a specific image is reproduced on a projection surface closest to the detected position of the object.

6. The performance system of claim 1, wherein the position detection device comprises a plurality of sensors distributed around the stage, and is configured to detect the position of the object using the plurality of the sensors.

7. The performance system of claim 1, wherein the additional effect device is configured to change the direction of the additional effect depending on the synchronized images projected on the plurality of projection surfaces.

8. The performance system of claim 7, wherein, when an object in the synchronized images moves between the projection surfaces, the additional effect device is configured to change the direction of the additional effect.

9. The performance system of claim 7, wherein when a specific event in the synchronized images occurs only on a specific projection surface among the plurality of projection surfaces, the additional effect device is configured to perform the additional effect toward the specific projection surface only.

10. The performance system of claim 2, further comprising:
a floor configured to detachably attach the audience seats.

11. The performance system of claim 10, wherein the floor comprises an insertion groove for detachable attachment of at least one audience seat among the audience seats.

12. The performance system of claim 11,
wherein the floor comprises an insertion groove cover, and
wherein the insertion groove cover is configure to be removable so that the at least one audience seat is detachably attached to the floor surface at the insertion groove.

13. The performance system of claim 10, wherein the floor is configured to perform a linear motion, rotational motion, height adjustment motion, tilting motion, or vibration motion.

14. A performance system comprising:
a stage installed for a performance;
a plurality of projection surfaces arranged around the stage and arranged unparallel to each other;
a position detection device configured to detect a position of an object or person placed on the stage; and
an additional effect device configured to perform an additional effect other than the images projected on the plurality of projection surfaces,
wherein the images projected on the plurality of projection surfaces are synchronized each other,
wherein the additional effect device is configured to configure a direction of the additional effect differently depending on position information of the detected position of the object or the detected person,
wherein the additional effect device is a light-emitting device, and
wherein the light-emitting device is configured to change a color of emitted light based on an image of a specific projection surface among the plurality of projection surfaces.

* * * * *